Nov. 27, 1951         R. J. ADAMS         2,576,382
AUTOMATIC VALVE FOR APPLYING AIR BRAKES

Filed June 28, 1946         2 SHEETS—SHEET 1

INVENTOR.
R. J. Adams
BY Wilfred E. Lawson
Attorney

Nov. 27, 1951 R. J. ADAMS 2,576,382
AUTOMATIC VALVE FOR APPLYING AIR BRAKES
Filed June 28, 1946 2 SHEETS—SHEET 2
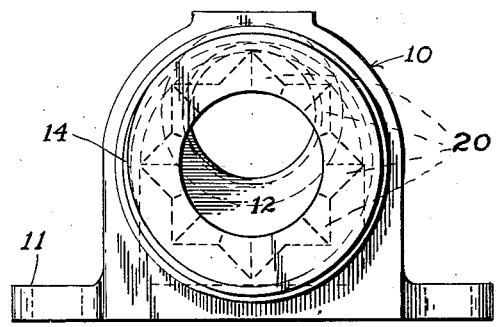
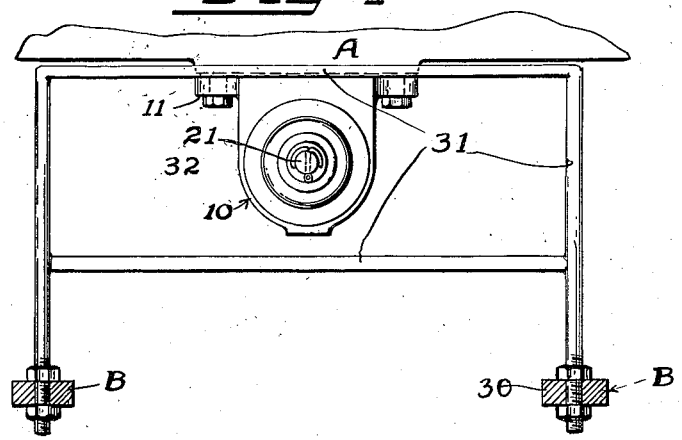
INVENTOR.
R. J. Adams
BY
Wilfred E. Lawson
Attorney Patented Nov. 27, 1951

2,576,382

UNITED STATES PATENT OFFICE 2,576,382

AUTOMATIC VALVE FOR APPLYING AIR BRAKES

Robert Joseph Adams, Ashland, Ky.

Application June 28, 1946, Serial No. 680,210

2 Claims. (Cl. 277—42)

The present invention relates to a valve for automatically stopping an engine in the event of an accidental interruption of the regular working of the same or of other machinery.

Primarily, the valve is intended for use on a locomotive having a pony truck, whereby the air brakes on a train are immediately applied to stop the train, whenever the truck is derailed or in any other manner broken up or put out of commission.

In other words, directly the truck wheels jump the tracks, this valve is designed to cause operation of the air brakes to stop the train and prevent the occurrence of accidents to the train or the passengers.

It is a well known fact to those familiar with the art, that to apply the air brakes in emergency on locomotive and train, there must be a sudden and heavy discharge of air pressure, either from the conductor's air valve, from the engineer's brake valve on the locomotive, or a broken air pipe on engine or train or from a burst air hose, or anything that will cause a quick and great reduction of air pressure from the brake pipe.

A further object of my invention is to provide a mechanism of a character whereby the device may be applied to any locomotive without placing any part of the device above the locomotive decks or walkways.

Still another object of my invention is to make the valve positive in its intent and action. My valve is normally a machine providing for and permitting all normal movements of the locomotive frame and the locomotive pony trucks without the operation of the safety valve.

Accordingly, my safety device must be placed at a safe distance from the locomotive trucks, and the valve is therefore placed on the frame of the locomotive as shown in the drawings and there is no direct connection between the valve and the locomotive truck as that would result in the opening of the valve and cause the application of the air brakes without the locomotive truck derailing.

It is a fact well known in the art that a mechanism of this nature must be placed in such a position that it will permit all normal movements of the locomotive frame and the pony truck, and that the device or valve will not operate by such normal movements, while at the same time the valve will immediately and fully operate in event the truck wheels derail. The movements of the trucks and the locomotive frame under ordinary circumstances is not so great as to cause the valve to operate, unless the trucks derail for one reason or another.

A great advantage of this valve resides in the fact that when once installed in operating position on a locomotive, it needs no further attention or care, because there is no possibility of wear or corrosion in any part thereof. Moreover, this safety valve on the locomotive will only be actuated by a lever on the truck when directly connected with the valve stem.

Due to this well-known feature of connection between the engine truck and the frame of the locomotive, it is necessary to allow for a considerable vertical and horizontal movement of the engine truck relatively to the engine frame.

A further object of importance of my invention is to provide a mechanism of this character in which the vent or exhaust ports of the valve are positively closed and locked. The construction of my invention assures that the more air pressure carried on the locomotive, the stronger the vents or exhaust is locked. When there is no air pressure on the locomotive the vent or exhaust as well as the valve is held tight by a spring. The object in keeping these vents and ports closed, is to keep ice, snow and dirt from stopping or restricting the vent or exhaust ports. This assures a full emergency operation of the air brakes at all times.

In the accompanying drawings one embodiment of the invention is illustrated as applied to a locomotive air brake line.

Figure 3 is a view of the forward end of the valve casing with the bonnet and adjacent parts removed; and Figure 4 is a front view of the valve actuating arm or gate.

Figure 1:
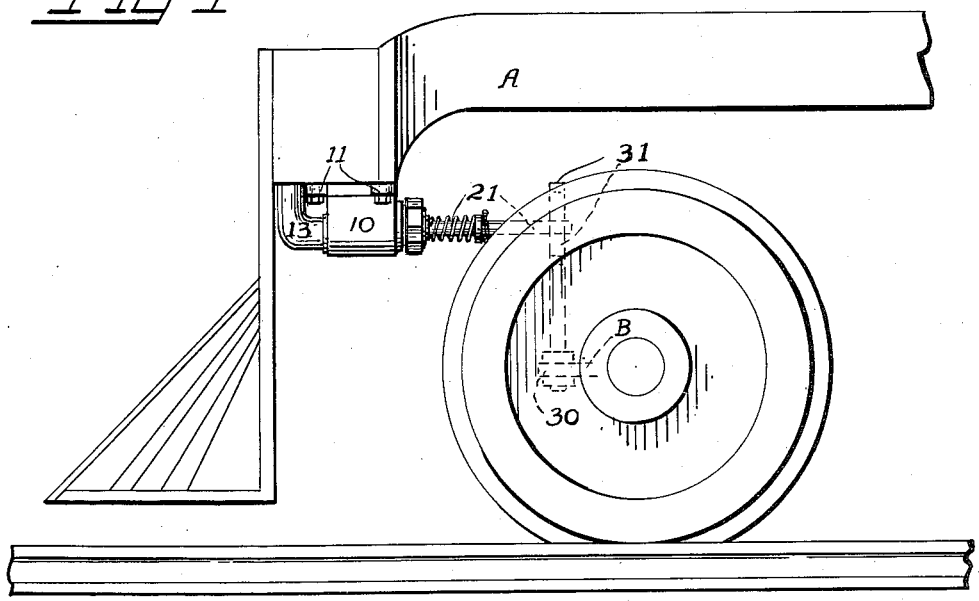
Figure 1 is a view in side elevation of a locomotive and truck with the automatic safety valve in position.
Figure 2:
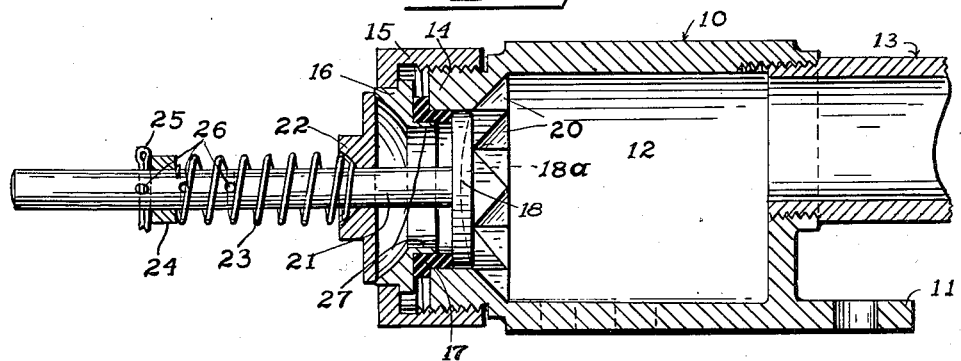
Figure 2 is a view in vertical section of the valve casting and valve elements assembled therein.

Like numerals refer to the same details in the different views and letter A denotes the locomotive frame to which the valve casing 10 is secured as by bolts or the like, which engage in the side lugs 11. Below frame 10 is seen a portion of the usual pony truck B.

The casing 10 is provided with a chamber 12 for compressed air which is received from the pipe line through the hose 13 connected at the inlet or front end of the casing 10.

At the rear end of the casing 10 is shown a threaded neck 14 adapted to receive the cap or valve union 15 to hold the metal bonnet 16 in place and to compress the flanged valve seat 17 made of rubber, so as to normally prevent all leakage past the piston head 18. The air pressure in the chamber 12 is, as usual, between 70 and 90 pounds per square inch, which acts directly against the piston head 18. The head is thin and made slightly concave at 18a for better effect and said head has an easy fit in its seat, so that the piston can freely rock in its seat. A number of vents 20 lead down from the chamber diameter to the piston seat 17 which has smaller diameter.

The bonnet 16 widens outwardly in order to afford an easy exit of the compressed air from the chamber 12 when the valve is tilted or fully opened.

The central valve stem 21 reaches out from the piston head considerably beyond the face of the bonnet 16, which has a flat outer surface against which is held slidable in any direction, the outwardly cupped spring-retaining washer 22 actuated by a compression spring 23 between the cupped portion of washer 22 and abutment ring 24 on the stem 21. The location of the ring 24, is adjustable in accordance to the spring pressure needed, by a dowel or split pin 25 engaging one of the several holes 26 drilled transversely through the stem 21. This spring arrangement alone is able to hold the piston and stem in closed position without the aid of the air compression in the chamber if the latter should fail.

The cupped washer 22 has an outside diameter larger than the cup diameter of the bonnet in order to normally close the air escape through the cup opening of bonnet 16. The latter has a small central flange 27 on which the rubber seat 17 rides and provides a passage-way for escaping compressed air from the chamber 12 to the atmosphere through the cupped portion of the bonnet 16, whenever the piston is tilted, that is when the valve is opened.

In a suitable position on the pony truck B is firmly secured an actuating unit 31. The same is here shown in the form of a gate with upright and transverse metal rods or tubing secured to the frame 30 by nuts or the like. These rods form a rectangular space 32 in the middle of which the end of the valve stem 21 is normally located.

The valve body or casing is attached with its flanges in any suitable manner to the forward end of the locomotive frame. The actuating unit 31 being connected to the truck frame 30, moves vertically and horizontally relative to the locomotive frame. However, regardless of the movements of the truck or locomotive frame, when the actuating unit 31 contacts the valve stem of the valve, the valve will open wide the vent ports and the sudden and great escape of compressed air will apply the air brakes in emergency.

With reference to the valve casing it is so constructed with its flange or web that it can be attached in any suitable manner as by bolts or other fastenings to the forward end of the locomotive frame.

A valve mechanism of this character must have an actuating unit 31 for operating my invention. The movement of the valve stem 21 in any way or direction, up-and-down, crossways, in fact in any direction, will cause the valve head 18 to open within the casing 10, which means that the valve head will lean away from the valve seat and at the same time the valve stem washer 22 is caused to slide or shift permitting the escape through the bonnet and thereby applying the air brakes. The valve head 18 of cast steel, transfers the air pressure of 70 to 90 pounds against the rubber valve seat 17. There is no chance for movement of the rubber valve seat as it is held in place first, by the valve spring and bonnet and, second, by the union nut 15 which clamps the valve within itself and to the body.

It should be noted that the principle is very simple. Its action opens the way for the escape of air by one movement of the valve stem regardless of which way the actuating lever is moved, caused by the derailment of the locomotive truck. Every time the valve stem is moved in any direction the valve head moves away from the rubber valve seat causing a reduction in air pressure.

It is to be understood that the invention as herein disclosed may be varied from the details described and shown without departure from the spirit of the subjoined claims.

I claim:

1. In a valve of the character described, an elongated hollow cylindrical body having a fluid inlet at one end and its other end reduced and provided with an axial bore constituting an outlet for the fluid, an annular flanged member threaded on said reduced end, a piston valve within said bore, a stem extending from said piston valve outwardly through the bore, a bonnet encircling the stem and having a portion interposed between the flanged member and the reduced end of the body, a gasket interposed between a portion of the bonnet and the adjacent reduced end of the body, a flange inturned from the inner perimeter of said gasket and disposed within and against the wall of said bore to provide a seat for said piston valve, a valve washer carried by said stem and engaged against the outer end of said bonnet for transverse shifting movement, a collar on said stem outwardly from said washer, and a coil spring encircling said stem between said washer and said collar, said piston valve when closed engaging said valve seat against which it is held by the fluid pressure within said body and said spring, said piston valve being of a diameter relative to said bore to permit rocking movement relative to its seat and said washer shifting across the engaged end of the bonnet upon the actuation of said stem to allow the fluid pressure within said body to exhaust to atmosphere.

2. The valve structure as defined in claim 1, with the end of said bore lying between the valve and the interior of the casing formed with a plurality of obliquely extending and gradually deepening grooves to effect the rapid escape of the fluid pressure from said body upon the shifting of said valves to open positions.

ROBERT JOSEPH ADAMS.

REFERENCES CITED

The following references are of record in the file of this patent:

UNITED STATES PATENTS

| Number | Name | Date |
|---|---|---|
| 851,465 | Williams | Apr. 23, 1907 |
| 947,142 | Wright | Jan. 18, 1910 |
| 972,027 | Ryder et al. | Oct. 4, 1910 |
| 2,121,553 | Stewart | June 21, 1938 |
| 2,171,178 | Johnson et al. | Aug. 29, 1939 |